(12) United States Patent
Sajnovic

(10) Patent No.: US 12,165,098 B2
(45) Date of Patent: Dec. 10, 2024

(54) SYSTEM AND METHOD OF CONTROLLING THE NAVIGATION OF A MOTOR VEHICLE EQUIPPED WITH A REMOVABLE COVERING SYSTEM

(71) Applicant: Innovaction Technologies, Epercieux St Paul (FR)

(72) Inventor: Srecko Sajnovic, Roanne (FR)

(73) Assignee: Innovaction Technologies, Epercieux St Paul (FR)

( * ) Notice: Subject to any disclaimer, the term of this patent is extended or adjusted under 35 U.S.C. 154(b) by 879 days.

(21) Appl. No.: 16/756,771

(22) PCT Filed: Oct. 4, 2018

(86) PCT No.: PCT/EP2018/077003
§ 371 (c)(1),
(2) Date: May 12, 2021

(87) PCT Pub. No.: WO2019/076640
PCT Pub. Date: Apr. 25, 2019

(65) Prior Publication Data
US 2021/0295256 A1     Sep. 23, 2021

(30) Foreign Application Priority Data

Oct. 16, 2017 (FR) ..................... 1759676

(51) Int. Cl.
*G06Q 10/0833* (2023.01)
*G01C 21/26* (2006.01)
(Continued)

(52) U.S. Cl.
CPC ....... *G06Q 10/0833* (2013.01); *G01C 21/265* (2013.01); *G01C 21/3453* (2013.01); *G01C 21/3697* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| 2002/0004703 A1 | 1/2002 | Gaspard, II |
| 2010/0057358 A1 | 3/2010 | Winer et al. |

(Continued)

FOREIGN PATENT DOCUMENTS

| EP | 3 101 600 A1 | 12/2016 |
| FR | 2 871 420 A1 | 12/2005 |

OTHER PUBLICATIONS

Guideline, MSD Prevention. "Ergonomic analysis: Three tarping systems for flatbed transport trailers." (Year: 2019).*

(Continued)

*Primary Examiner* — Emmett K. Walsh
(74) *Attorney, Agent, or Firm* — CHRISTENSEN O'CONNOR JOHNSON KINDNESS PLLC

(57) ABSTRACT

The invention relates to a system for controlling the navigation of a motor vehicle equipped with a covering system that can be removed depending on the cargo being transported, comprising a system for controlling a vehicle and a remote site, said control system comprising: a first comparison means capable of periodically comparing the positioning signal received from a means for identifying the position of the removable covering, with a value associated with a position of said removable covering; a control means capable of transmitting a volume request to a means for determining the volume that is being transported, and a position request to a positioning device, upon receiving a signal from said first comparison means; transmitting and receiving means capable of transmitting the volume and the position that have been determined to a remote site and (Continued)

capable of receiving at least one request to load said remote site, including at least one load position, load description and load volume; means for displaying the loading request; and a remote site that is equipped with processing and storing means, capable of receiving the volume and position of the vehicle as determined, of receiving at least one loading request for the vehicle, and of determining whether said vehicle can accept the loading request depending on the vehicle specifications, the vehicle position and the loading request.

12 Claims, 1 Drawing Sheet

(51) Int. Cl.
  *G01C 21/34* (2006.01)
  *G01C 21/36* (2006.01)

(56) References Cited

U.S. PATENT DOCUMENTS

| | | |
|---|---|---|
| 2012/0253862 A1 | 10/2012 | Davidson |
| 2014/0244098 A1 | 8/2014 | Jeda et al. |
| 2015/0006005 A1 | 1/2015 | Yu et al. |
| 2015/0006428 A1* | 1/2015 | Miller ............... G06Q 10/0835 |
| | | 705/336 |
| 2016/0334236 A1 | 11/2016 | Mason et al. |

OTHER PUBLICATIONS

International Search Report mailed Nov. 22, 2018, issued in corresponding International Application No. PCT/EP2018/077003, filed Oct. 4, 2018, 6 pages.

* cited by examiner

SYSTEM AND METHOD OF CONTROLLING THE NAVIGATION OF A MOTOR VEHICLE EQUIPPED WITH A REMOVABLE COVERING SYSTEM

The technical field of the invention is that of navigation systems for vehicles, and notably for goods transport vehicles.

The navigation of a transport vehicle traditionally relies on a route plan specifying at least one loading/unloading site and the route to be followed, and prepared for each vehicle of a fleet by a logistics service.

With the advent of road navigation systems, such systems have evolved so that the only inputs now needed are the loading/unloading sites, the route to be followed being determined by the onboard road navigation system.

However, modifying the path or the stoppages of the vehicle involves a radio telephone communication with the driver in order to advise him of a new route plan or the electronic transmission of a new version of the route plan. Although this method works, it does not allow communication with the vehicle or allow the route plan of the vehicle to be modified easily.

In addition, the automation of the first few transport trucks provides a glimpse at the progressive disappearance of the driver. In such cases, it is necessary to have an at least partly automated navigation system that allows the destination of the autonomous vehicle to be modified.

Thus, there is a need for a navigation and communication system that allows two-way communication between the vehicle and a remote site, so that the route plan can be modified by the remote site in real time according to data transmitted by the vehicle relating to its operation.

There is also a need to secure cargos and transport vehicles against theft or against the fraudulent incursion of cargo or of individuals onto a vehicle, by monitoring the volume of the cargo.

One object of the invention is a system for controlling the navigation of a motor vehicle equipped with a removable covering system according to the cargo being transported. The system comprises a vehicle control system and a remote site,
the control system comprising
a first comparison means, able to periodically compare the position signal received from a removable-cover position-identifying means with a value associated with a position of the removable cover,
a control means able to emit a volume request intended for a transported-volume determining means and/or a floorspace area request for the volume or floorspace occupied by the cargo to a calculation means and a position request intended for a positioning device on receipt of a signal from the first comparison means,
transmission and reception means able to transmit the determined volume and/or floorspace area and the determined position intended for a remote site and able to receive at least one loading request from said remote site, comprising at least a position of the load, a description of the load and a volume and/or floorspace area of the load,
means for displaying the loading request, and
a remote site equipped with processing and memory means, and able to receive the determined volume and/or the floorspace area and the determined position of the vehicle, able to receive at least one loading request intended for the vehicle, able to determine whether the vehicle is able to accept the loading request according to the specifications of the vehicle, to the position of the vehicle and to the loading request.

The display means may be a road navigation aid system.

The transported-volume determining means may comprise a calculation means and a memory, the calculation means being able to communicate with a vehicle mass estimating means,
on receipt of a volume request, the calculation means being able to determine the volume of the cargo present in the vehicle by calculating the difference between the unladen weight of the vehicle minus the mass of the vehicle on receipt of the request, divided by the density of the cargo.

The density of the cargo may be predetermined according to the volume and mass data of the loading request.

The unladen weight of the vehicle may be predetermined according to the vehicle specifications supplied by the manufacturer.

The unladen weight of the vehicle may be determined by a mass measurement made by the mass estimating means at a reference instant when the vehicle is not transporting cargo.

The remote site may be able to determine the volume available in the vehicle by calculating the difference between the vehicle cargo volume and the total cargo volume that the vehicle can accept.

The remote site may be able to determine whether the volume on the loading request is less than the available volume, whether the sum of the mass to be loaded and of the mass of the vehicle is lower than the total laden weight of the vehicle, and, when the vehicle comprises at least one cargo, whether the difference in distance between the destination of the load and the destination of the at least one cargo of the vehicle is less than a predetermined distance threshold and, if all of those conditions are satisfied, is able to transmit the loading request to the vehicle.

The position of the removable cover may be the open position and/or the closed position.

Another subject of the invention is a method for controlling the navigation of a motor vehicle equipped with a removable covering system according to the cargo being transported in connection with a remote site. The method comprises steps during which:
at the vehicle:
the position of the removable cover is determined,
it is determined periodically whether the removable cover position signal corresponds to a value associated with a position of the removable cover,
if it does, the volume being transported and/or the floorspace area occupied by the cargo and the position of the vehicle are determined,
the determined volume and/or floorspace area and the determined position are transmitted to a remote site, and
at the remote site:
the volume and/or floorspace area and the determined position of the vehicle are received,
at least one loading request intended for the vehicle is received,
it is determined whether the vehicle is able to accept the at least one loading request according to the specifications of the vehicle, to the position of the vehicle and to the loading request,
if it is, the at least one loading request is transmitted to the vehicle.

Further objects, features and advantages of the invention will become apparent from reading the following description given solely by way of nonlimiting example and made with reference to the attached figures in which.

Known from the prior art is patent application FR1457845 which discloses a removable cover for a truck body, making it possible to cover or uncover the truck body or the trailer of a truck by driving hoops inserted inside a covering tarpaulin. The hoops are generally supported by a rail and attached to a drive cable which allows them to be moved in one direction or the other under the action of a motor.

Figure 1:
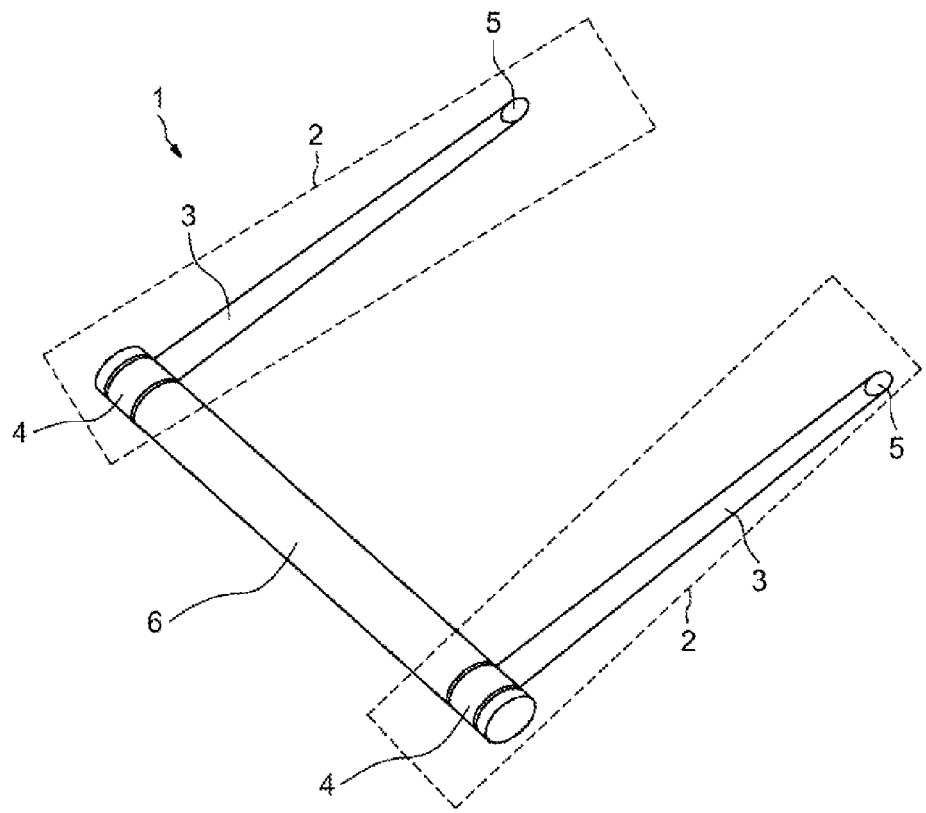
FIG. 1 illustrates the key elements of a removable covering system.

FIG. 1 illustrates a removable covering system according to document FR1457845. The removable covering system 1 comprises two movement devices 2 each one comprising a drive cable 3 collaborating with part of a front wheel 4 and a rear wheel 5. The drive cable 3 supports hoops inserted in a tarpaulin. A motor 6 allows the cables 3 to be driven via the front wheels 4. It will be noted that the motor 6 and the front wheels 4 are contained inside the one same element. By way of example mention will be made of a cylinder fitted with wheels at its ends and with an axial motor inserted inside the interior volume thereof. Through their movements, the drive cables 3 allow the hoops and the tarpaulin to be moved, covering or uncovering the truck body according to the direction of travel.

In contrast with the state of the prior art, such a removable covering system 1 makes it possible to avoid a loss in tension of the drive cables 3. The system can thus be automated without special monitoring, unlike systems of the prior art, the deployment or retraction of which need to be monitored. The automatic covering system also allows the removable cover to be opened or closed in just a few seconds as opposed to the several tens of minutes required for systems of the prior art.

In addition, when a removable covering system is equipped with a removable-cover position-identifying means 8, it is possible to determine the open or closed state of the removable cover and thus determine whether access to the cargo may have been gained. A removable-cover position-identifying means 8 may consist of the combination of a coded tab and of a corresponding detector, the coded tab being connected with the rotation of the motor or of one of the wheels collaborating with the drive cable.

Finally, the presence of a removable cover makes it possible to delimit the vehicle volume that can be used by a cargo and monitor same.

Figure 2:
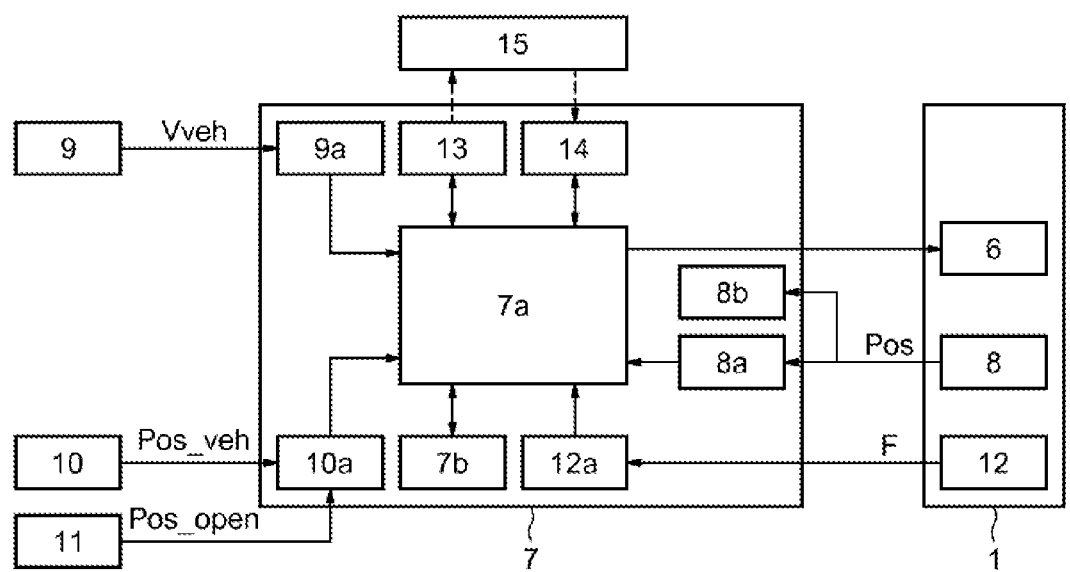
FIG. 2 illustrates the key elements of a control system according to the invention.

FIG. 2 illustrates the control system 7 according to the invention.

The control system 7 comprises a control means 7a able to trigger the estimating of the volume of the cargo present in the vehicle as soon as the removable cover is opened.

In order to do that, the control system 7 comprises a first comparison means 8a able to periodically compare the position signal received from a removable-cover position-identifying means 8 with a value associated with the open position. When the position signal corresponds to the value associated with the open position, the first comparison means 8a emits a signal intended for the control means 7a.

The control means 7a then emits a volume estimation request intended for the transported-volume determining means 9 which in return sends back a value for the volume of the cargo in the vehicle.

It may be seen that the control system 7 also comprises a means 9 for determining the volume transported by the vehicle, able to determine the volume of the cargo present in the vehicle.

In one embodiment, the transported-volume determining means 9 comprises a calculation means 9a and a memory 9b, the calculation means 9a being able to communicate with a means 12 of estimating the mass of the vehicle.

The vehicle-mass estimation means 12 makes it possible to determine the mass of the vehicle according to a model generally dependent on the traction force and the speed or acceleration experienced by the vehicle. By applying the general equation of mechanics ($\Sigma F = ma$ where F is the forces applied to the vehicle and a is the acceleration experienced by the vehicle), it is possible to determine the mass of the vehicle.

The calculation means 9a requires a mass measurement from the mass estimation means 12 at a reference moment, when the vehicle is not transporting a cargo. This is generally performed according to the route plan (notably during complete unloading, or when coupling an empty trailer). In one alternative embodiment, the mass of the vehicle may be predetermined, for example according to the manufacturer specifications, and stored in the memory 9b.

On receipt of a volume request, the calculation means 9a requires a measurement of the mass of the vehicle.

The calculation means 9a then determines the volume of the cargo by calculating the difference between the unladen weight minus the mass of the vehicle on receipt of the request, divided by the density of the cargo.

The density of the cargo may be predetermined, for example for a mining truck that always transports the same loose cargo or may be received from the remote site 15. In the latter instance, the density is estimated on the basis of volume and mass data transmitted by the customer (total mass, individual packaging, etc.).

In one embodiment, when the control means 7a receives a signal indicating that the removable cover is in the open position, the control means 7a then emits a request to estimate the floorspace area occupied by the cargo. A calculation means provided with a memory then determines the floorspace area occupied by the cargo according to the total floorspace area for cargo available in the vehicle, to the surface area occupied by the cargo that has been unloaded and/or the surface area occupied by the cargo loaded and the surface area occupied by the other cargos in the vehicle.

On receipt of the signal from the first comparison means 8a, the control means 7a also emits a position request intended for a positioning device 10. The positioning device 10 in return transmits a signal relating to the position of the vehicle Pos_veh.

After determining the volume of the load and/or the floorspace area occupied by the load and the position of the vehicle, the control means 7a transmits this information to transmission and reception means 13, 14 so that it can be transmitted to a remote site 15.

The remote site 15 comprises reception and transmission means able to collaborate with the transmission and reception means 13, 14 of the vehicle, at least one processing means, such as at least one processor associated with random-access memory and/or non-volatile memory, and connected to at least one data network, notably the Internet, by any suitable protocol and to at least one data storage means (for example at least one hard disk or static disk of the SSD (Solid State Device) type).

The remote site 15 thus receives the data pertaining to the position, to the loading volume and/or to the floorspace area occupied by the load each time the removable cover is opened, for each vehicle from which it receives data, and is able, for each vehicle, to generate a map relating the position and the load volume of the vehicle at the time of last opening of the movable cover.

The processing means at the remote site 15 are thus able to know the location and the remaining capacity of the vehicle and to generate a map indicating the location and the capacity of the vehicle. What is meant by the remaining capacity is the volume or floorspace area available in the vehicle to receive a cargo. The remaining capacity may be determined by the processing means by subtracting the volume of the load which is received from the vehicle from the total capacity of the vehicle stored in memory or by subtracting the floorspace area occupied by the load which is received from the vehicle from the total floorspace area of the vehicle.

In the particular case of available volume, it should be noted that this may be understood differently according to whether it is loose materials or packaged goods (boxes, pallets) that are concerned. Specifically, in the case of the former, other materials can be added to an existing cargo only if the characteristics of the added cargo correspond to the characteristics of the existing cargo. Specifically, once added, it will no longer be possible to differentiate between the two cargos. Such a situation is not a problem in the case, for example, of the removal of rubble from demolition or excavation sites headed for a storage or processing site. By contrast, the loose transportation of raw materials (coal, wheat, chemical products, etc.) in this way may be problematic if the additions are not of the same quality (purity, level of maturity, etc.) as the initial cargo.

In the case of packaged goods, the loads may be added to the one same vehicle. Specifically, the packaging of such goods generally comprises a means of identifying the goods so that they can be tracked, and the goods are generally packaged on pallets.

The remote site 15 is then able to publish the map thus determined to at least one user via the data network, preferably the Internet. The user can consult the map either by an Internet browser and a suitable web page, or using a mobile app.

In one embodiment, the user may find himself authorized to interact with a vehicle via the remote site 15 in order to schedule a loading/unloading stop, associated with at least one volume or floorspace area of cargo and with the destination of the vehicle. The user authorization may vary from one vehicle to another, and relate only to loading or only to unloading.

On receipt of the loading/unloading information comprising the location of the cargo, the volume or the surface area and the mass of the cargo and its destination, the remote site 15 determines whether this information is compatible with the chosen vehicle. In order to do that, it is determined whether the mass and the volume or surface area of the cargo can be accepted by the vehicle, by taking into consideration the cargos that are in the process of being transported. It is also determined whether the destination of the cargo is situated at an acceptable distance from the other cargos that are to be delivered or to be loaded. It is possible in this way to ensure that the vehicle does not make excessive detours. If these checks are satisfied, the remote site 15 transmits the information to the vehicle concerned using the reception and transmission means.

The control means 7a receives the data of the loading request via the transmission and reception means 13, 14 and transmits them to display means so that the operator is informed of the new destination of his vehicle, of the cargo to pick up, of the site to which to deliver the cargo and possibly. In one particular embodiment, the display means are a road navigation aid system 11 allowing the information of the loading request to be displayed and making it possible to determine the path to be followed in order to reach the position of the loading contained in the request.

On the basis of the volume and position data transmitted by the control system, the remote site 15 may also determine that the cargo intended in the vehicle route plan has indeed been loaded or unloaded and that no unexpected cargo has been loaded or unloaded.

The remote site 15 may thus prevent the theft of goods, the intrusion of people on board, or the hijacking of the truck for unauthorized transport.

In one particular embodiment, the control means 7a may attach to the data transmitted the itinerary that the vehicle has followed since the previous opening of the removable cover. The itinerary comprises a succession of positions received from the positioning device 10, acquired by the control means 7a with their acquisition dates, while awaiting the next transmission. What is meant by the acquisition date is the day, the month, the year, the time in hours, minutes, seconds or fractions of a second corresponding to when the position was determined by the positioning device 10. The precision may be chosen according to the frequency of transmission of requests by the control means 7a and the precision required as to the itinerary of the vehicle.

In addition to monitoring the cargo volume of the vehicle in order to detect potential nefarious entry or exit of the vehicle, it is thus possible to correlate the variations in mass with a divergence between the intended itinerary and the itinerary followed between two openings of the removable cover.

What is meant by operator is the driver of a traditional vehicle, the remote driver of a piloted vehicle such as a drone, or the vehicle control program or system when the vehicle is autonomous or semi-autonomous.

The above description has been given with consideration to the opening of the removable cover as being the event that triggers the determining of the volume and the communication with the remote site 15.

However, it is possible to consider the closing of the removable cover as being the triggering event, or to consider the opening and the closing as being triggering events. The latter alternative of course makes it possible to achieve a higher level of monitoring and of security.

The invention claimed is:

1. A motor vehicle comprising:
   a removable covering system comprising a removable cover, a rotating wheel collaborating with a drive cable that allows the removable cover to be moved, and removable-cover position-identifying means including a coded tab connected to the rotating wheel and a corresponding coded tab detector, wherein the removable-cover position-identifying means is configured to determine whether the removable cover is an open position or a closed position and to transmit a removable cover position signal to a first comparison means indicating whether the removable cover is in the open position or the closed position;
   an on-board vehicle control system to control navigation of the motor vehicle according to a route plan, the on-board vehicle control system comprising:
      a first comparison means configured to periodically compare the removable cover position signal received from the removable-cover position-identifying means with a value associated with the open position of the removable cover, a control means configured to emit a volume request intended for a transported-volume determining means and/or a floorspace area request for the volume or floorspace occupied by cargo to a calculation means and a position request intended for a positioning device, the position request, the volume request, and/or the floorspace area request being emitted on receipt of a signal from the first comparison means indicating that the removable cover is in the open position, transmission and reception means configured to transmit the determined volume and/or floorspace area and the determined position intended for a remote site and receive at least one loading request from said remote site, comprising at least a position of the load, a description of the load and a volume and/or floorspace area of the load, and means for displaying the loading request, wherein the remote site is equipped with processing and memory means, and configured to receive the volume and/or the floorspace area and the determined position of the motor vehicle, to receive at least one loading request intended for the motor vehicle, to determine whether the motor vehicle is able to accept the loading request according to the specifications of the motor vehicle, the position of the motor vehicle and the loading request, and to transmit a modified version of the route plan to the motor vehicle in a case where the motor vehicle is able to accept the at least one loading request according to the specifications of the motor vehicle, the position of the motor vehicle and the loading request.

2. The motor vehicle of claim 1, wherein the display means are a road navigation aid system.

3. The motor vehicle of claim 1, wherein the transported-volume determining means comprises a calculation means and a memory, the calculation means configured to communicate with a vehicle mass estimating means, on receipt of a volume request, the calculation means configured to determine the volume of the cargo present in the motor vehicle by calculating the difference between the unladen weight of the motor vehicle minus the mass of the motor vehicle on receipt of the request, divided by the density of the cargo.

4. The motor vehicle of claim 3, wherein the density of the cargo is predetermined according to the volume and mass data on the loading request.

5. The motor vehicle of claim 1, wherein the unladen weight of the motor vehicle is predetermined according to vehicle specifications supplied by the manufacturer.

6. The motor vehicle of claim 1, wherein the unladen weight of the motor vehicle is determined by a mass measurement made by the mass estimating means at a reference instant when the motor vehicle is not transporting cargo.

7. The motor vehicle of claim 1, wherein the remote site is configured to determine the volume available in the motor vehicle by calculating the difference between the vehicle cargo volume and the total cargo volume that the motor vehicle can accept.

8. The motor vehicle of claim 1, wherein the remote site is configured to determine whether the volume of the loading request is less than the available volume, whether the sum of the mass to be loaded and of the mass of the motor vehicle is lower than the total laden weight of the motor vehicle, and, when the motor vehicle comprises at least one cargo, whether the difference in distance between the destination of the load and the destination of the at least one cargo of the motor vehicle is less than a predetermined distance threshold and is configured to, if all of those conditions are satisfied, transmit the loading request to the motor vehicle.

9. A method to control navigation of a motor vehicle equipped with a removable covering system and an on-board vehicle control system for controlling navigation of the motor vehicle according to a route plan, wherein the removable covering system comprises a removable cover, a rotating wheel collaborating with a drive cable that allows the removable cover to be moved, and removable-cover position-identifying means including a coded tab connected to the rotating wheel and a corresponding coded tab detector, the method comprising:

at the motor vehicle, by the removable-cover position-identifying means, determining whether the removable cover is an open position or a closed position and transmitting a removable cover position signal indicating whether the removable cover is in the open position or the closed position;

at the motor vehicle, by the on-board vehicle control system:
controlling navigation of the motor vehicle according to the route plan;
determining periodically whether the removable cover position signal corresponds to a value associated with the open position of the removable cover,
determining volume of the cargo being transported and/or floorspace area occupied by the cargo and position of the motor vehicle in a case where the removable cover position signal corresponds to the value associated with the open position of the removable cover,
transmitting the determined volume and/or floorspace area and the determined position to a remote site, and at the remote site:
receiving the determined volume and/or the determined floorspace area and the position of the motor vehicle,
receiving at least one loading request intended for the motor vehicle,
determining whether the motor vehicle is able to accept the at least one loading request according to the specifications of the motor vehicle, to the position of the motor vehicle and to the loading request, and
transmitting the at least one loading request and a modified version of the route plan to the motor vehicle in a case where the motor vehicle is able to accept the at least one loading request according to the specifications of the motor vehicle, the position of the motor vehicle and the loading request.

10. The method of claim 9 further comprising:

at the motor vehicle:
attaching an itinerary that the motor vehicle has followed since an opening of the removable cover to the data transmitted, the itinerary comprising a succession of positions received from a positioning device with dates at which the positions have been acquired;

at the remote site:
determining a distance between each position of the itinerary received and the corresponding position of the itinerary transmitted with the route plan;
determining if one of the distances determined is greater than a predetermined threshold; and emitting an alarm when one of the distances determined is greater than a predefined threshold.

11. The method according to claim 10 further comprising:
estimating a date of arrival of each position of the itinerary transmitted with the route plan;
determining a time span between the acquisition date of each position of the itinerary received and the estimated date of each corresponding position of the itinerary transmitted with the route plan;
determining if one of the time spans determined is greater than a predefined duration; and
emitting an alarm when one of the time spans determined is greater than a predefined duration.

12. The method according to claim 11, wherein a precision associated with determining the vehicle position depends on a frequency of transmission to the remote site and a precision required as to the itinerary of the motor vehicle.

* * * * *